United States Patent

[11] 3,551,673

| [72] | Inventor | Harold Siegel |
| | | 230 East 69th St., New York, N.Y. 10021 |
| [21] | Appl. No. | 719,640 |
| [22] | Filed | Apr. 8, 1968 |
| [45] | Patented | Dec. 29, 1970 |

[54] SELF-OPENING DENTAL X-RAY FILM PACK
1 Claim, 6 Drawing Figs.

[52] U.S. Cl. ..................................................... 250/69, 250/70
[51] Int. Cl. ....................................................... G03b 17/26
[50] Field of Search ............................................ 95/100; 250/69, 70

[56] References Cited
UNITED STATES PATENTS
3,152,252 10/1964 Wainwright et al........... 250/69X 3,374,353 3/1968 Saffir............................. 250/69

*Primary Examiner*—William F. Lindquist
*Attorney*—Norman H. Gerlach

ABSTRACT: A self-opening dental X-ray film pack including the usual X-ray-sensitive film proper; two black paper sheets, one on each side of the film; an outer moistureproof envelope; and a lead shield between one black paper sheet and the outer envelope. The pack, after exposure of the film, is adapted, along with similar packs, to be mounted in rack-supported clips which engage only the marginal regions of the envelope and film so that when the envelope is slid longitudinally away from the film, the black paper sheets, lead shield and envelope are withdrawn, leaving only the film and small ruptured fragments of the envelope in supported relationship on the clip. This obviates difficult envelope-opening and film-mounting procedure.

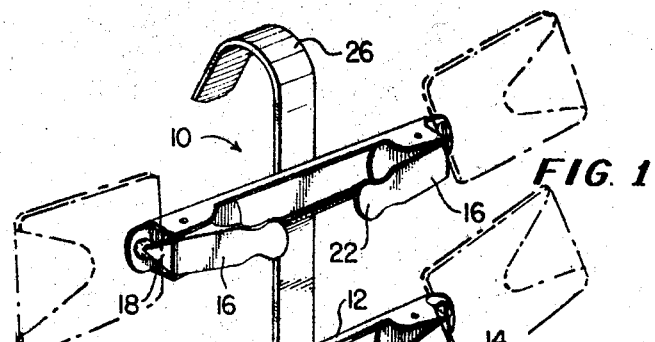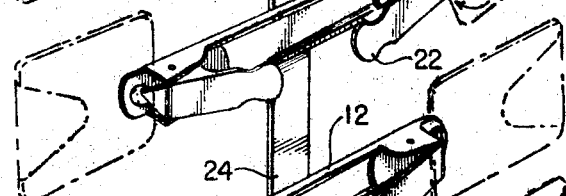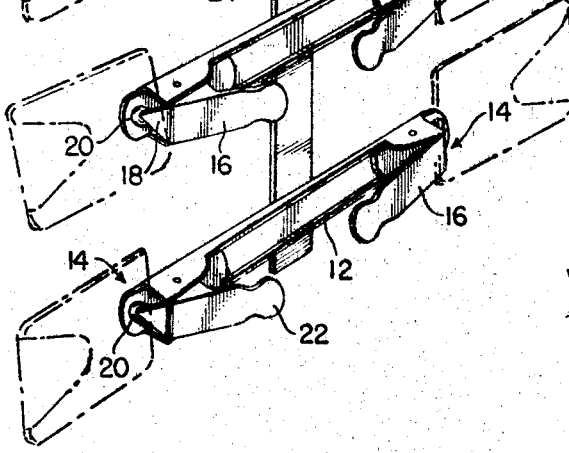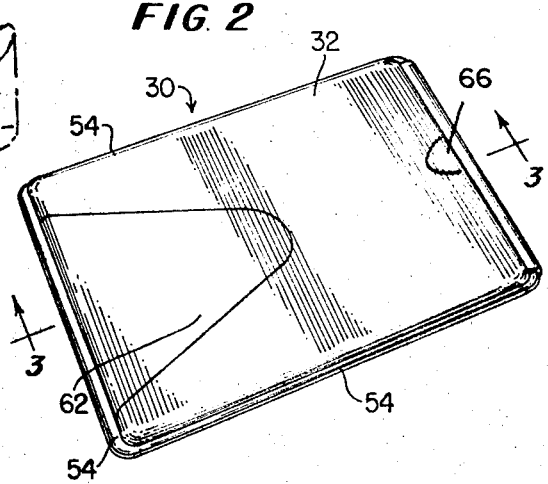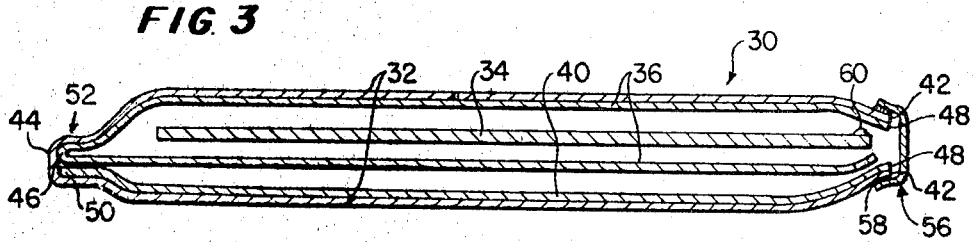

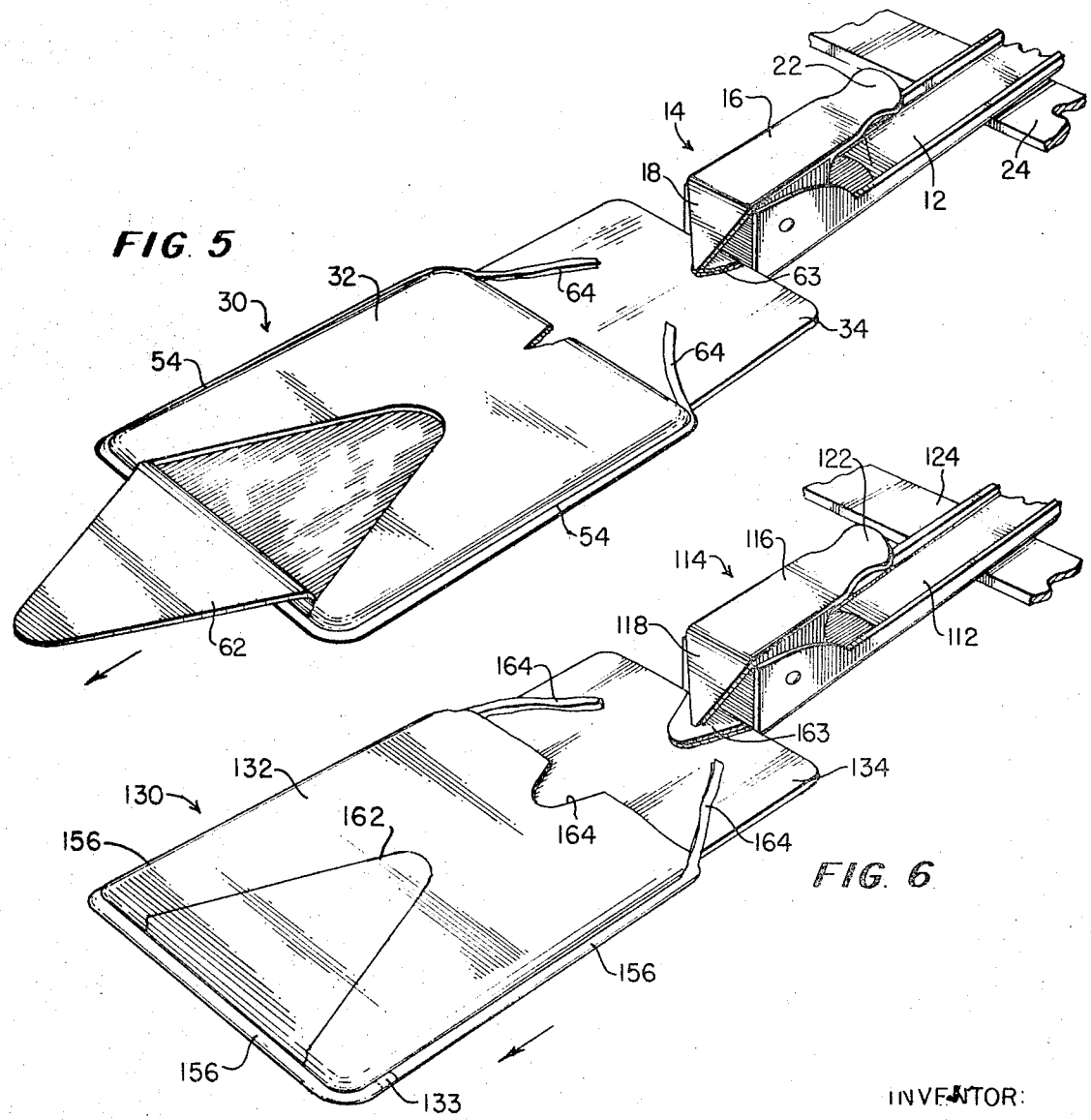

3,551,673

SELF-OPENING DENTAL X-RAY FILM PACK

The present invention relates generally to X-ray film and has particular reference to a dental X-ray film pack which is an improvement upon and has advantages over previously designed dental X-ray film packs by reason of the fact that it obviates the necessity of opening the usual paper envelope or wrapper of the pack, then extracting the X-ray sensitive film therefrom, and finally mounting the film in a film-holder clip for development purposes.

A dental X-ray film pack of the type under consideration consists essentially of a package or packet consisting of: (1) the X-ray-sensitive film proper; (2) two black paper sheets; (3) an encompassing protective folded paper envelope which is formed of moisture impervious material; and (4) a lead shield between one black paper sheet and the envelope. Heretofore, in the development in quantity of the X-ray films of dental film packs, it has been the practice to tear open the encompassing protective folded paper envelopes in the darkroom and to extract the films therefrom, and then individually to mount each film in a film-holder clip on a conventional or standard rack. The rack may embody as many as sixteen clips, and after the various films have been properly mounted in their respective clips, the rack with the undeveloped films thereon is immersed in a developing and/or fixing solution. The difficulties inherent in this procedure are numerous and among these are the matter of opening the various envelopes in the darkroom, the removal of the black papers and lead shields without marring the X-ray films, the danger of finger contact with the exposed but undeveloped film surfaces, the attainment of proper film orientation on the various film-holding clips on the rack, and the time that is consumed in performing all of these operations.

The present invention is designed to overcome the aforementioned limitations that are attendant upon present day dental X-ray film pack handling and film development, and toward this end, the invention contemplates the provision of a novel form of dental X-ray film pack which reduces darkroom operations to a minimum by eliminating the necessity of individually opening the envelope of each pack prior to insertion of the film in its respective film-holder clip, the improved pack being so designed that after an exposure has been made the unopened pack may be mounted in the selected clip of the rack, after which the envelope may be slid longitudinally from the film, the clip serving to retain only the film properly oriented for subsequent rack manipulation during film development, while the two sheets of black paper, together with the lead shield, are retained within the envelope as the latter is stripped, so to speak, from the clip-retained film.

The invention is susceptible to numerous modifications, the basic principle of film retention to the exclusion of the remaining portions of the X-ray film pack being preserved regardless of the basic physical makeup of the pack. For example, whereas some manufacturers employ a crimping operation for sealing the meeting side and end edges of the envelope of the pack, other manufacturers employ channel strips for effecting such sealing, and still other manufacturers employ a combination of crimping operations and channel strips, the present invention may, by suitable modification, be adapted for use with all such film packs regardless of the manner in which the edges of the encompassing envelope are sealed. Similarly, the use of a conventional pull tab on the film pack envelope, or the particular placement of the tab on the envelope, or the omission of such pull tab altogether, does not preclude the use of the present invention.

The provision of a dental X-ray film pack such as has been briefly outlined above constitutes the prinicpal object of the invention. Other objects and advantages not at this time enumerated, will become readily apparent as the nature of the invention is better understood from a consideration of the following detailed description.

The invention consists in the several novel features which are hereinafter set forth and are more particularly described by claims at the conclusion hereof.

In the accompanying two sheets of drawings forming a part of this specification, two illustrative embodiments of the invention are shown.

In these drawings:

FIG. 1 is a perspective view of a conventional development immersion rack, showing a number of dental X-ray film packs embodying the present invention operatively mounted thereon preparatory to stripping of the enclosing envelopes and other constituent parts of the packs from the exposed X-ray films;

FIG. is an enlarged perspective view of one of the improved X-ray film packs of FIG. 1

FIG. 3 is an enlarged longitudinal sectional view taken on the substantially horizontal plane indicated by the line 3–3 of FIG. 2 and in the direction of the arrows, the pack being slightly laterally extended in the interests of clarity;

FIG. 4 is a sectional view, schematic in its representation, taken longitudinally and centrally through an X-ray film pack embodying the invention and illustrating the manner in which the encompassing envelope and other constituent parts of the pack are stripped from the clip-captured or -retained X-ray film preparatory to film development operations;

FIG. 5 is a perspective view of the X-ray film pack that is shown in FIG. 4; and FIG. 6 is a perspective view similar to FIG. 5 but showing a modified form of X-ray film pack embodying the invention.

Referring now to the drawings in detail and in particular to FIG. 1, a conventional film development rack is designated in its entirety by the reference numeral 10, and it is shown as being comprised of a plurality of vertically spaced, parallel clip-supporting bars 12, each bar serving to support at its opposite ends a pair of film-holding clips 14. The clips consist of pivotally mounted jaw members 16 having at their outer ends sharp or pointed jaws 18 which cooperate with backing jaws or anvils 20 for clamping X-ray films therebetween. The jaw members of the clips 14 are spring-biased so that the pointed jaws 18 yieldingly bear against the anvils 20 with an appreciable degree of pressure, and finger pads 22 are provided on the inner ends of the jaw members 16 for manipulative purposes in connection with opening of the clips. The various clip-supported bars 12 are mounted in their parallel relationship on a central supporting post 24 and the upper end of the latter is formed with a hook portion 26 by means of which the entire rack may be suspended with the various films submerged in a suitable pool (not shown) of a developing and/or fixing solution. The arrangement of parts thus far described is purely conventional and no claim is made to any novelty in the same, the novelty of the present invention residing rather in the construction of the various X-ray film packs which embody the X-ray films that are designed for development by use of the rack.

Whereas, with a conventional X-ray film pack, it is necessary to open the encompassing envelope and separate the exposed X-ray film from the usual black paper sheets and lead shield before mounting the film in the selected clip 14, the entire X-ray film pack of the present invention is adapted to be mounted in the selected clip 14 immediately after an exposure has been made, such a mounting being illustrated in FIG. 1; and thereafter, by the simple expedient of forcibly sliding the encompassing envelope in telescopic fashion longitudinally or edgewise from the film, a limited portion of the envelope is ruptured from the main body thereof by reason of the X-ray film being pinched, so to speak, through the body of the envelope, while the film and such ruptured portion of the envelope as may remain are captured by the associated clip without disturbing the positional relationship of the film, all in a manner that will be described in detail presently.

The X-ray film pack of the present invention is designated in its entirety by the reference numeral 30, eight such packs being illustrated in FIG. 1 of the drawings. As shown in FIGS. 2 to 5, inclusive, each pack involves in its general organization a generally rectangular enveloping wrapper or envelope 32 which is preferably formed of a moisture-impervious material, such, for example, as treated paper stock and is closed and sealed along its four edges. Loosely disposed within the envelope 32 is the X-ray film 34 which is sandwiched or interposed between two sheets 36 of light impervious material such as black paper or the like. Interposed between one of the black paper sheets 36 and the outer envelope 32 is a thin flexible lead shield 40. The above-mentioned constituent parts of the film pack 30 are inherent in practically all conventional X-ray film packs, but they are related to one another in different ways by different manufacturers. The present X-ray film pack likewise may have its constituent parts related to one another in various ways but in the form which has been selected for illustration the envelope 32 is comprised of a single elongated sheet of paper which is folded midway between its distal end edges 42 (see FIG. 3), the fold being designated by the reference numeral 44. The black paper sheets 36 likewise are folds of a single length of paper which is folded at 46 midway between its end edges 48. The lead shield 40 is a composite dual-thickness sheet having one end edge or margin 50 encased in the folds 46 and 44, the folds and lead shield being crimped together as indicated at 52. The transverse width of the black paper sheets 36 and also of the envelope 32 may be approximately equal while the width of the lead shield 40 is slightly less than the width of the envelope so that the four thicknesses of material including the envelope 30 and the black paper sheets 36 may be crimped together and thus sealed along their longitudinal edges as shown at 54 (see FIG. 2). The length of the lead shield 40 is slightly less than the length of the envelope 32, as is the length of the X-ray film 34, the later being free of all of the edges of the envelope and of the paper sheets. The distal end of the envelope, that is, the end that is opposite the fold 46 is sealed by means of a transversely extending channel strip 56 which is folded over the edges 42 and 48 and is secured in position by coatings 58 of a suitable adhesive. It will be understood that the disclosures of both FIGS. 3 and 4 are expanded views, made in the interest of clarity, the normal condition of the envelope and its contents being a flat one wherein the laminae 32, 36, 34, 40, 32 and 36 (reading from top to bottom in FIG. 3) are contiguous, and wherein the channel strip 56 is a folded strip.

The X-ray-sensitive film 34 may be of conventional flat platelike construction but preferably it is formed with a transverse rib 60 along the end edge or margin that is adjacent to the channel strip 56. The rib is shown as facing away from the lead shield 40, although, if desired, the rib may face in the opposite direction.

The end portion of the envelope 32 that is opposite to the end portion with the channel strip 56 is provided with a tear flap or tab 62 as is customary in connection with X-ray film packs of the general type under consideration.

The manner in which a series of the X-ray film packs are processed for development is illustrated schematically in FIGS. 1, 4 and 5. After exposure of the films 34, the packs are mounted in selected clips 14 by inserting the distal edge portions of the assembled packs, which, incidentally, remain unopened, between the pointed jaws 18 of the clips and their associated anvils 20. The insertions are made with the clips engaging the envelopes at regions substantially midway between the side edges of the envelopes. Upon release of the jaw members 16, the pointed jaws 18 penetrate the material of the envelopes 32 and one of the black paper sheets 36 and come to rest on the X-ray films 34, or at least, these pointed jaws will exert a relatively powerful clamping action on the five laminae including the envelopes, the black paper sheets and the films. Care must be taken to insert the distal edge regions of the envelopes sufficiently far into the clips that the jaw members will overhang the channel strips 56 as well as the aforementioned ribs 60 on the X-ray films 34.

With all of the X-ray film packs 30 thus held in position within their respective clips 14 as shown in FIG. 1, the various films 34 may be stripped of their encompassing envelopes 32 and the associated black paper sheets 36 and the lead shields 40 by the simple expedient of pulling the tear flaps 62 in a direction away from the rack 10 as illustrated in FIG. 5. Initially, each tear flap will be pulled out of the general plane of the envelope and, thereafter, when tension is applied to the flap as indicated by the arrow in FIG. 5, the film 34 will be held by the associated clip 14 while the envelope 32 and its contents, other than the film, will be slid endwise in telescopic fashion away from the film. Due to the sharp or pointed end of the jaw 18, small fragments of the envelope and the black paper sheets 36 may be ripped away from the pack 30 as indicated at 63, while at the same time the channel strip 56 will become ruptured as indicated at 64. The lead shield will be withdrawn from the film 34 along with the envelope 32 and the black paper sheets 36, leaving only the film 34 captured by the associated clip 14. Moreover, the X-ray film 34 will retain its proper positional relationship and after all of the envelopes 32 have been stripped from their respective films 34, the films will assume generally parallel relationship wherein their longitudinal axes are disposed at a right angle to the central supporting post 24 of the rack 10. This parallel relationship will be attained despite the fact that in the initial introduction of the exposed film packs to the clips 14, certain of the packs may not be accurately centered with respect to the clips. In other words, because of the fact that the jaws 18 make point contact with the envelopes, the latter are capable of pivotal movement about their respective planes during the flap-pulling operation, and if the operator exerts a proper longitudinal directional pull to the tear flaps, all of the films will be straightened out, so to speak, after the multiple stripping operations have been completed. With only the X-ray films 34 left intact in the clips 14, the rack and the films that are captured thereby are ready for submersion in the pool of developing solution.

In order to facilitate proper placement of the envelopes between the jaws of the 14, indicia areas 66 (see FIG. 2) may be printed, embossed or otherwise made visible on the outer sides of the envelopes in the distal regions of the latter, the areas 66 being designed for register with the pointed jaws 18 of the clips when the envelopes are applied to the latter.

In FIG. 6, a slightly modified form of X-ray film pack 130 embodying the principles of the present invention is illustrated. Due to the general similarity of construction between the pack 130 and the previously described pack 30, and in order to avoid needless repetition of description, similar reference numerals but of a higher order have been applied to the corresponding parts as between the disclosures of FIGS. 5 and 6, for example.

In the X-ray film pack 130, the side and end edges of the envelope 132 are closed and sealed by utilizing a single channel strip 156, the ends of which may overlap at any desired peripheral portion of the envelope, as, for example, at 133 near one corner of the envelope. In order to assure facile stripping of the envelope 132, together with its contained black paper sheets 136 and the lead shield 140 from the film 134, the distal edges of all of these laminae may be provided with semicircular score lines which result in positive retention by the associated jaw 118 and anvil 120 of small semicircular disc fragments such as have collectively been designated at 163. In such an instances, the jaw 118 of the clip 114 need not be pointed. Otherwise, the X-ray film pack 130 remains substantially the same as the X-ray film pack 30, and its mode of operation during the development procedure also remains substantially the same.

The invention is not to be limited to the exact arrangement of parts shown in the accompanying drawings or described in this specification as various changes in the details of construction may be resorted to without departing from the spirit or scope of the invention. For example, the specific manner in which the side and end edges of the envelope are closed and sealed may be varied according to the dictates of the individual manufacturers, crimping or channel-sealing operations being exemplary methods of closing the edges of the envelope. Similarly, if desired, separate black paper sheets may be employed instead of a single folded sheet.

I claim:

1. A substantially flat X-ray film pack adapted to be clamped between the opposed jaws of a rack-supported clip and comprising a flat rectangular X-ray-sensitive film, an X-ray pervious, light impervious sheet formed of frangible material on each side of said film, an enveloping wrapper completely enclosing said film and light impervious sheets, a metallic shield interposed between one of said sheets and the outer enveloping wrapper, said film in its entirety being loosely and freely disposed within the wrapper, said wrapper being formed of frangible material and presenting distal end regions which overhang the distal edge of the film whereby when the overhanging portions of the wrapper, film and sheets are clamped between the opposed jaws of a clip, said shield will remain free of the clip, means securing the proximate edge regions of the shield to the proximate edge regions of the wrapper and sheets whereby, upon application of pulling force to the enveloping wrapper in a direction tending to move the same endwise away from the clip, the wrapper and the sheets and shield attached thereto will be displaced bodily as a unit, leaving only the film in clamped relationship with respect to the clip, together with any small fragments of the sheets and wrapper which may be torn from the main bodies thereof by the application of such pulling force, and a transversely extending rib formed on said film in close proximity to the distal edge thereof and projecting out of the plane of the film, said rib serving as a reaction member to insure retention of the film by the clip when pulling force is applied to the wrapper.